No. 691,840. Patented Jan. 28, 1902.
H. W. CHINNERY.
APPARATUS FOR DISPLAYING ADVERTISEMENTS.
(Application filed Sept. 3, 1901.)
(No Model.)
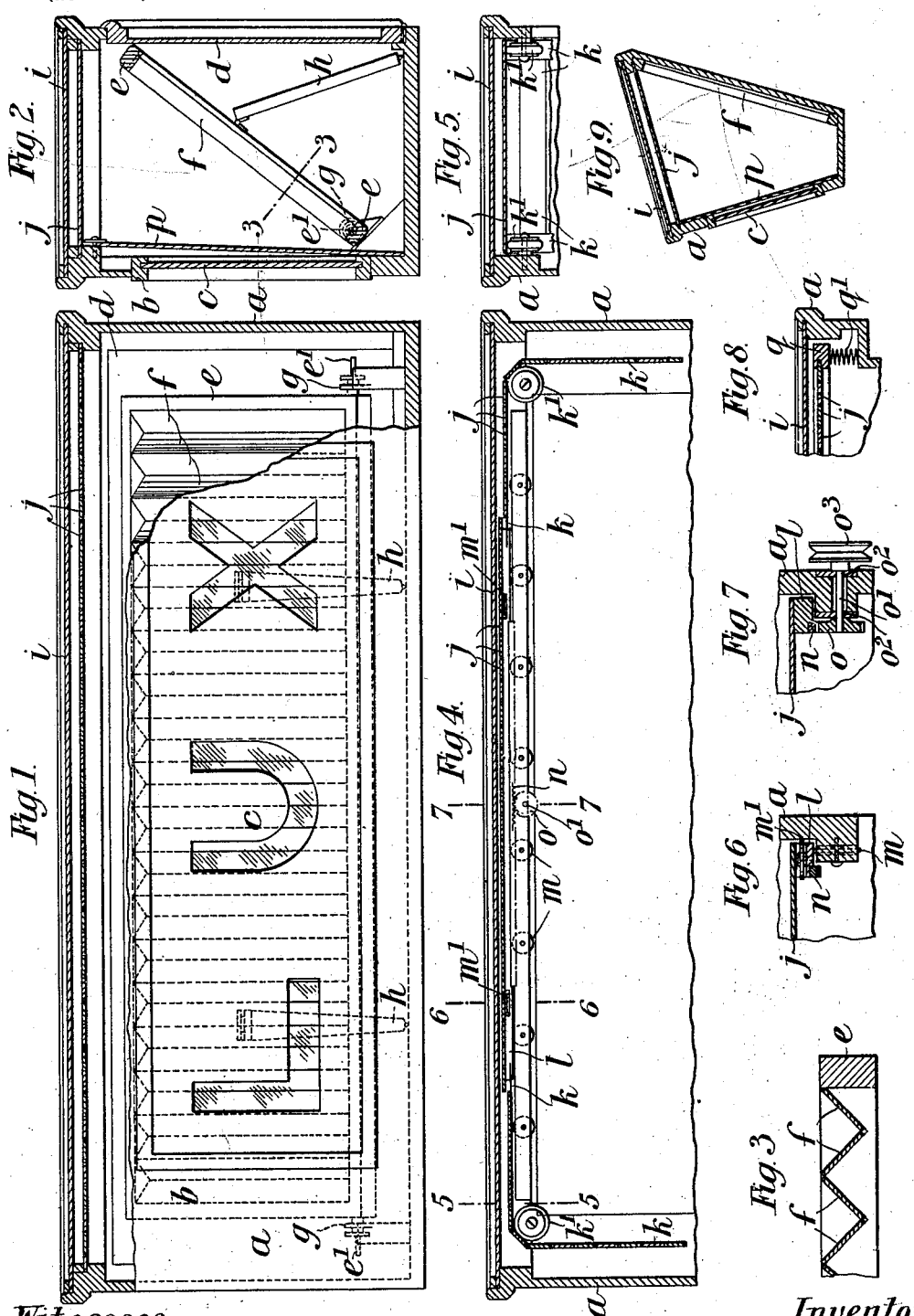
Witnesses.
Inventor.

UNITED STATES PATENT OFFICE.

HOWARD WILLIAM CHINNERY, OF LONDON, ENGLAND.

APPARATUS FOR DISPLAYING ADVERTISEMENTS.

SPECIFICATION forming part of Letters Patent No. 691,840, dated January 28, 1902.

Application filed September 3, 1901. Serial No. 74,148. (No model.)

*To all whom it may concern:*

Be it known that I, HOWARD WILLIAM CHINNERY, a subject of the King of Great Britain, residing at 23 Charles street, Queen's road, Holland Park, London, England, have invented new and useful Improvements in Apparatus for Displaying Advertisements, of which the following is a specification.

This invention relates to improvements in apparatus for displaying advertisements, and has for its object to provide an apparatus which shall show an advertisement in many colors either with sunlight or with artificial light, these colors varying with the point of view of the observer and also being, if desired, caused to vary by mechanical means.

According to the invention I construct my apparatus of a suitable case, the front of which is provided with the advertisement, formed of glass or other suitable transparent or translucent material. At the back of the advertisement-plate and inside the casing I arrange a reflecting-surface, preferably extending upward and backward from the bottom of the said plate at an angle of forty-five degrees, the said reflecting-surface being composed of a number of mirrors, preferably arranged at an angle of ninety degrees with one another, so that the said reflecting-surface is of a zigzag shape in cross-section. The top of the case is provided with a multicolored sheet of glass or other suitable transparent or translucent material. With this arrangement sunlight or artificial light passes through the colored transparent sheet at the top of the case and is reflected and scattered from the surface of the corrugated reflector, so that the light is projected through the transparent advertisement, which thus appears to be illuminated in many colors. As an observer passes in front of the advertisement the colors vary in infinite variety, owing to the mode in which the rays of light reflected from the corrugated mirror are scattered. In some cases I may provide for moving the colored strips of glass, so that in this way I am enabled to cause the colors of the illuminated advertisement to vary.

In the accompanying drawings, Figure 1 is a sectional front elevation of an illuminating advertisement constructed according to the invention. Fig. 2 is a transverse section thereof. Fig. 3 is a section on the line 3 3, Fig. 2, drawn to a larger scale. Fig. 4 is a sectional view of the upper part of the casing, showing the colored strips mounted in a movable frame. Fig. 5 is a section on the line 5 5, Fig. 4. Fig. 6 is a section on the line 6 6, Fig. 4, drawn to a larger scale. Fig. 7 is a section on the line 7 7, Fig. 4, also drawn to a larger scale. Fig. 8 is a sectional view showing a method of mounting the frame carrying the colored strips on springs; and Fig. 9 is a transverse section, drawn to a smaller scale, of apparatus formed with an inclined front and top.

$a$ is the case of the apparatus, which is here shown as rectangular in shape, and $b$ is a frame which is fitted in front of the apparatus and which is provided with a glass plate $c$, upon which the advertisement is applied—for example, by stenciling—so that the device or the words forming the advertisement are transparent or translucent, the rest of the plate being opaque.

$d$ is the back of the casing, which is made removable to enable access to be had to the interior thereof.

$e$ is a frame which is fitted with the series of reflecting surfaces or mirrors $f\,f$, arranged approximately at right angles to one another, as clearly shown in Figs. 1 and 3, so as to form a continuous zigzag reflecting-surface behind the plate $c$, bearing the advertisement. The said frame $e$ is provided with pivots $e'\,e'$ at its lower end, which pivots are held in bearings $g\,g$, secured to the bottom of the casing $a$, so that the said plate can have its angle adjusted, being supported in the position to which it is adjusted by the legs $h\,h$, pivoted to the back thereof.

$i$ is a glass or other transparent top of the casing $a$, and $j\,j$ are strips of different-colored glass, which together form a continuous plate underneath the transparent plate $i$ and which, as above described, allows light of different colors to be projected onto the corrugated reflecting-surface $f$ and thence through the advertisement-plate $c$. In Figs. 1 and 2 the colored-glass strips $j\,j$ are cemented together, so as to form a rigid plate, which is fixed in the top of the casing, as clearly shown. In the arrangement shown in Figs. 4, 5, 6, and 7 provision is made for reciprocating the colored-glass strips, which are held together by strips of cloth or the like at their ends, so as to form two flexible bands $k\ k$, passing over rollers $k'\ k'$, fixed inside the casing and being attached at their inner ends to slides $l\ l$, which have fixed upon them a series of colored strips $j\ j$, so that this series, together with the two lateral flexible series $k\ k$, form the complete transparent multicolored plate. The slides $l\ l$ run upon rollers $m\ m$, pivoted to the front and back of the casing, and are provided with rollers $m'\ m'$ to prevent them rubbing against the said front and back. A rack $n$ is furnished upon the under side of the rear slide $l$, whereby the said slide, and consequently the colored-glass plate, can be reciprocated by means of the pinion $o$, mounted upon the spindle $o'$, extending through a bearing $o^2$, provided in the back of the casing and having keyed upon the portion which projects through the said back a pulley $o^3$, adapted to be rotated to and fro from any suitable motor, so that the said pinion, and consequently the rack and glass plate, can be reciprocated.

$p$ is a plate of muffled, ribbed, or similar glass arranged behind the advertisement-plate $c$, the object being to more completely split up the rays of light reflected from the reflecting-surface $f$, so as to produce more interesting illuminating effects.

I sometimes arrange for oscillating the reflecting-surface from the position shown to an upright position, so as to cause the advertisement to alternately appear and disappear. This can be effected by any suitable mechanism, such as by a cam or connecting-rod actuated from a motor. Where the apparatus is to be fitted to a vehicle or the like subjected to vibration, I can utilize this vibration to vary the color effects, and to this end I advantageously mount the colored-glass strips $j\ j$ in a frame $q$, Fig. 8, and support the said frame upon springs $q'\ q'$ in the top of the casing $a$.

In Fig. 9 I have shown the casing made with an inclined front and top, so that when the back is placed vertically against a wall or other support the front inclines forward at an angle. This form of casing is especially suitable where the advertisement is erected at a considerable height, as it enables the passers-by to obtain a full front view of the advertisement.

When my apparatus is placed in position, the rays of sunlight or the rays from any suitable source of artificial light, such as electric lights, placed above the apparatus pass through the colored-glass strips $j\ j$ and fall onto the corrugated reflecting-surface $f\ f$, which scatters the rays and causes them to pass through the stencil advertisement, which is thus illuminated with light of many colors, producing a striking, brilliant, and pleasing effect. As the observer alters his point of view—say in passing in front of the advertisement, or as the advertisement passes in front of him—the light effects are constantly varied, and with the arrangement shown in Figs. 4 to 7 this changing effect is enhanced by the reciprocating movement imparted to the colored-glass strips $j\ j$.

Having now particularly described and ascertained the nature of my said invention and in what manner the same is to be performed, I declare that what I claim is—

1. In an apparatus for displaying advertisements, the combination with a casing of an advertisement provided with transparent portions, a reflecting device located in rear of and at an angle to said advertisement and provided with a plurality of mirrors arranged in a zigzag line, and a transparent multicolored plate above said reflecting-plate, adapted to transmit light thereto, substantially as described.

2. In an apparatus for displaying advertisements, the combination with a casing of an advertisement provided with transparent portions, a reflecting device located in rear of and at an angle to said advertisement and provided with a plurality of mirrors arranged in a zigzag line, a movable transparent multicolored plate arranged to transmit light to said reflecting-plate, and means for keeping said multicolored plate in motion, substantially as described.

3. In an apparatus for displaying advertisements, the combination with a casing of an advertisement provided with transparent portions, a reflecting device located in rear of and at an angle to said advertisement and provided with a plurality of mirrors arranged in a zigzag line, a transparent multicolored plate arranged to transmit light to said reflecting-plate, said plate being movable toward and from said reflecting-plate, and springs supporting said multicolored plate, substantially as described.

4. In an apparatus for displaying advertisements, the combination with a casing, of an advertisement provided with transparent portions, a reflecting device located in rear of and at an angle to said advertisement and provided with a plurality of mirrors arranged in a zigzag line, a transparent multicolored plate arranged to transmit light to said reflecting-plate and a muffling-plate interposed between said reflecting-plate and said advertisement, substantially as described.

5. In an apparatus for displaying advertisements, the combination with a casing of an advertisement provided with transparent portions, a reflecting-plate pivoted in said casing, and provided with a series of mirrors arranged in a zigzag line, devices for adjusting said pivoted reflecting-plate with respect to the advertisement, and a transparent multicolored plate arranged to transmit light upon said reflecting-plate, substantially as described.

HOWARD WILLIAM CHINNERY.

Witnesses:
JOHN E. BOUSFIELD,
C. G. REDFERN.